UNITED STATES PATENT OFFICE.

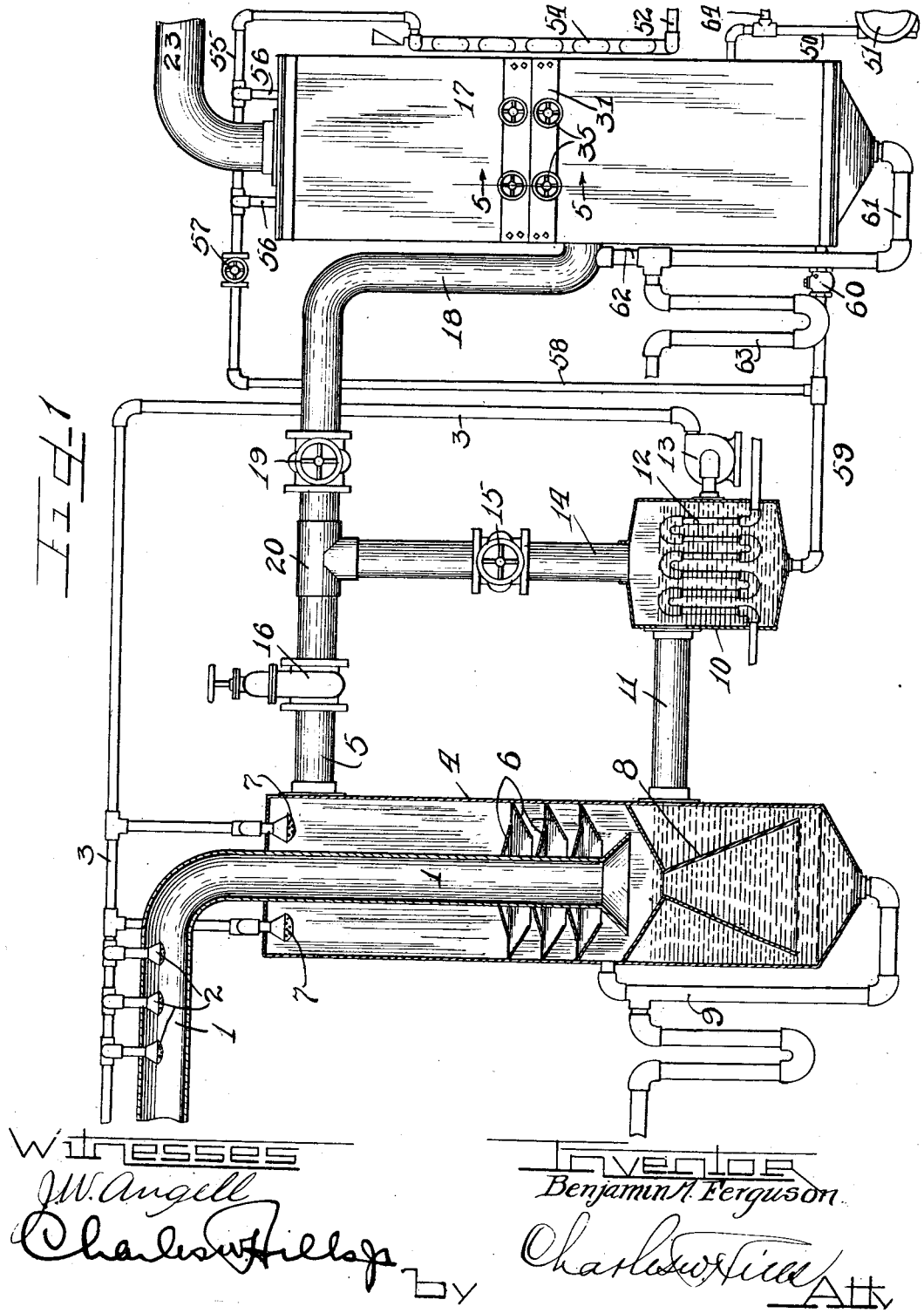

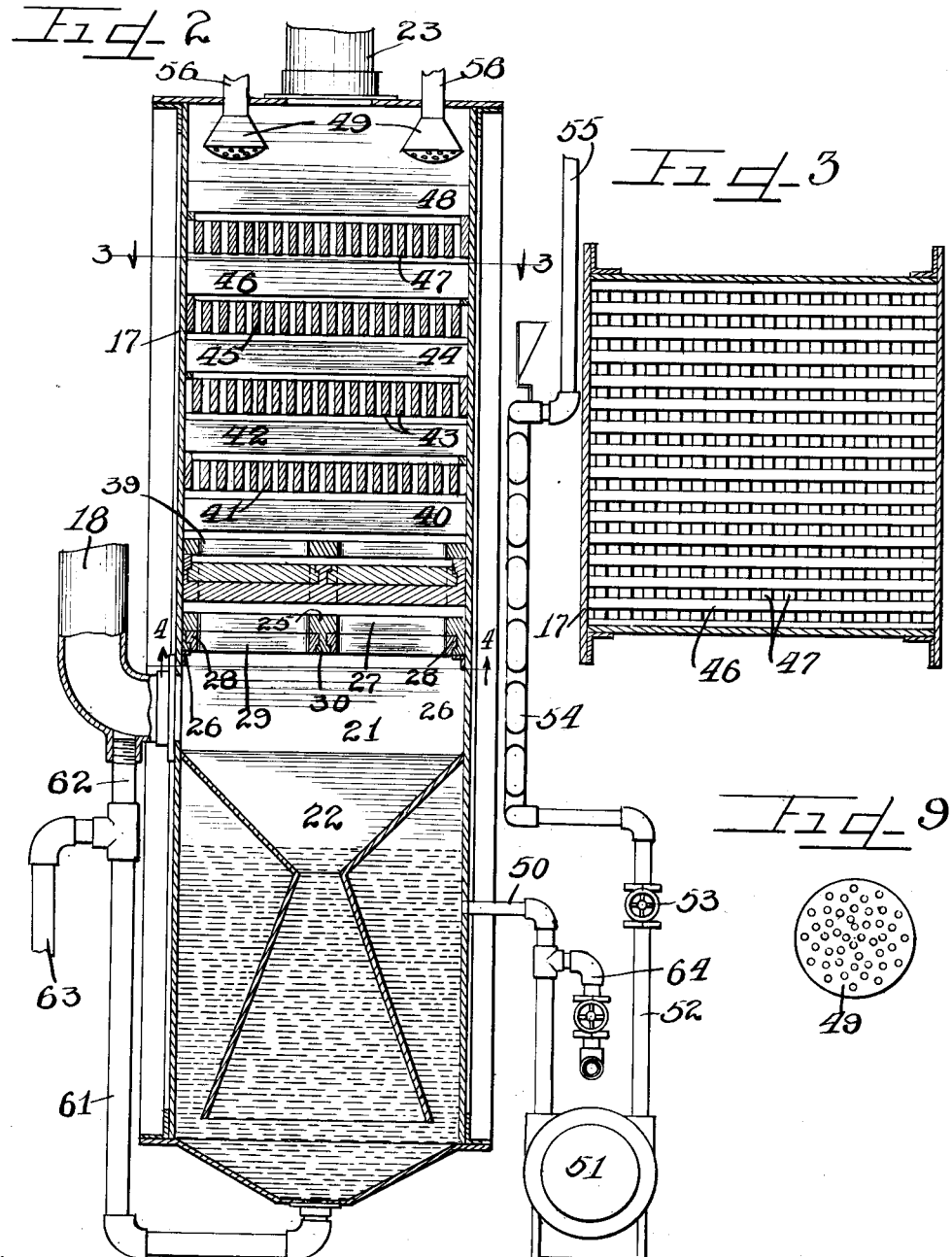

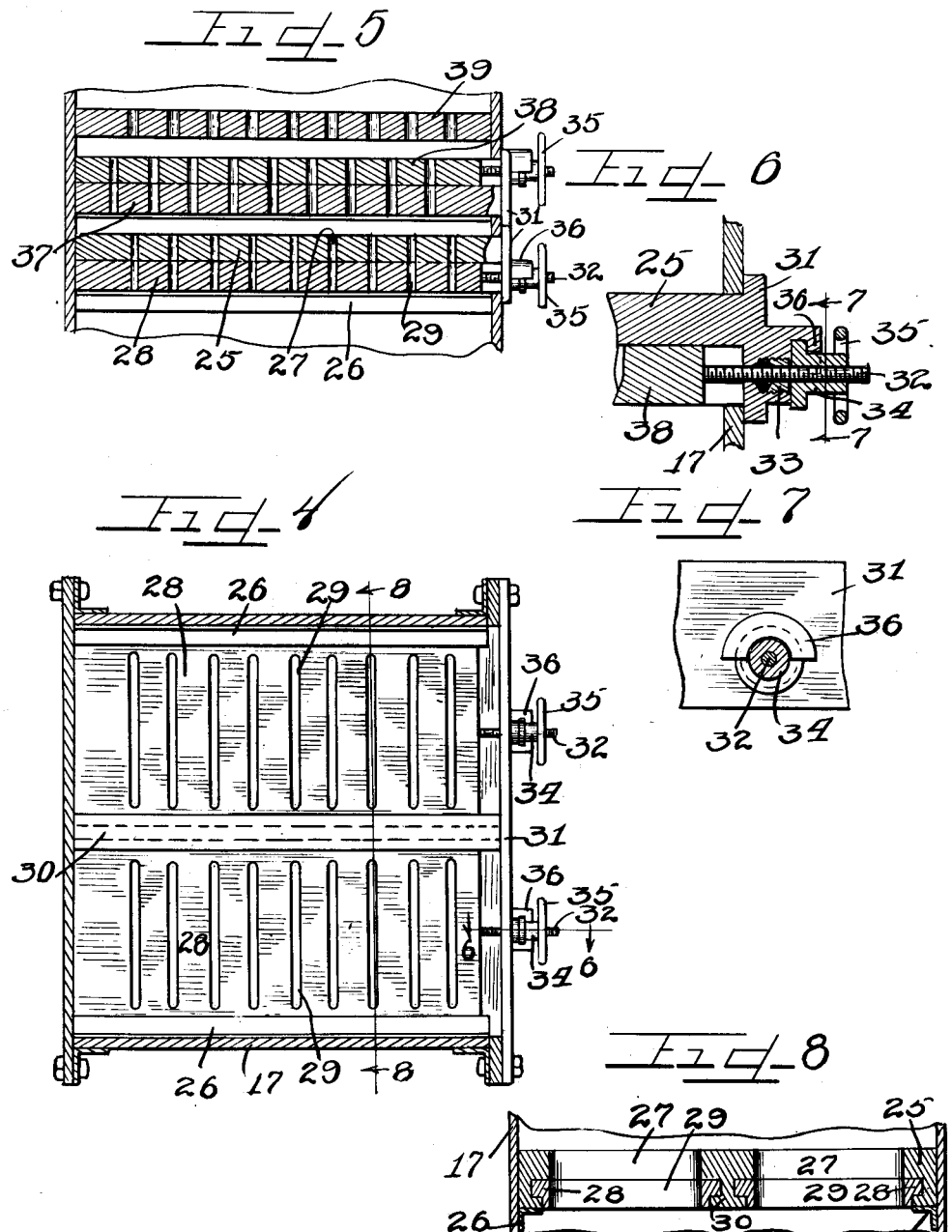

BENJAMIN M. FERGUSON, OF CHICAGO, ILLINOIS.

GAS-PURIFYING PROCESS AND APPARATUS.

1,182,543.　　　Specification of Letters Patent.　　Patented May 9, 1916.

Application filed October 17, 1914. Serial No. 867,053.

*To all whom it may concern:*

Be it known that I, BENJAMIN M. FERGUSON, a citizen of the United States, and a resident of the city of Chicago, in the county of Cook and State of Illinois, have invented certain new and useful Improvements in Gas-Purifying Processes and Apparatus; and I do hereby declare that the following is a full, clear, and exact description of the same, reference being had to the accompanying drawings, and to the numerals of reference marked thereon, which form a part of this specification.

One of the great objections to gas purifying systems as heretofore constructed has been the arrangement of the parts which permits the gas and impurities entrained therewith, principally tar and tar fog, to remain together in contact with one another at continually reducing temperatures for a considerable length of time. This acts to impoverish the quality of the gas, due to the absorbing action or affinity of the tar for the light and heat giving hydro-carbons, principally benzol, contained in the gas and also increases the liability of naphthalene stoppages. However, by this invention I propose to effect a rapid precipitation of the impurities from the gas in the cooling scrubber or condenser, preventing the absorption of the light and heat giving hydrocarbons during the time of passage of the gas to said condenser by spraying the gas with heated liquor or condensates, the heat and vapor content of which is actually higher than that of the gas. The precipitation of the impurities in the scrubber is effected by causing the mixture to flow through apertures of small area at high velocity, and to impinge upon baffle plates, meanwhile subjected to the action of a flow of cooled liquor.

It is an object of this invention to construct a purifying apparatus for gas acting to effect a complete tar extraction without the use of auxiliary apparatus necessitating frequent attention or cleaning, and operating to remove a maximum amount of naphthalene.

It is also an important object of this invention to construct a purifying apparatus, the elements acting to prevent premature cooling of the gas in contact with the tarry impurities therein, thus preventing absorption of the light and heat giving hydrocarbons.

It is furthermore an important object of this invention to construct a purifying apparatus for gas received from the hydraulic main, which by treatment with pre-heated condensates actually raises the heat and vapor content of the gas, the impurities being finally and rapidly precipitated therefrom by passage through small apertures at high velocity and impingement upon baffle plates, the area of said apertures capable of variation for different quantities of gas.

It is finally an object of this invention to construct a gas purifying system wherein means operate to effect a rapid precipitation of the impurities from the gas by passage through openings of adjustable area at a high velocity and impingement upon baffle plates, the gas at the same time subjected to a countercurrent of cooled liquor.

The invention (in a preferred form) is illustrated in the drawings and hereinafter more fully described.

In the drawings: Figure 1 is a diagrammatic view with parts in section and parts in elevation of the layout of the apparatus. Fig. 2 is a central vertical section taken through the condenser or scrubber of the apparatus with parts shown in elevation. Fig. 3 is a section taken on line 3—3 of Fig. 2. Fig. 4 is a detail section taken on line 4—4 of Fig. 2. Fig. 5 is a fragmentary section taken on line 5—5 of Fig. 1 with parts shown in elevation. Fig. 6 is a detail section taken on line 6—6 of Fig. 4. Fig. 7 is a detail section taken on line 7—7 of Fig. 6. Fig. 8 is a section taken on line 8—8 of Fig. 4. Fig. 9 is a plan view of one of the spray nozzles.

As shown in the drawings the reference numeral 1 indicates the foul pipe, which leads from the hydraulic main. (not shown) containing the gas therein, which has been partially cooled, and with the tar suspended therein in a finely divided state in the form of a fog or smoke. The tar has associated therewith naphthalene and other by-products which it is desirable to remove, and yet at the relatively high temperature of the gas the tar has not had the opportunity to absorb the light and heat producing hydro-carbons which it tends to take up when it cools. To prevent such cooling of the tar and absorption of the light and heat hydro-carbons, the mixture in the foul pipe is brought into intimate contact with a spray of hot liquid condensates which are at such a temperature that the vapor content of the gas is increased and so that the gas is thus prevented from cooling and throwing down the tar. For this purpose a plurality of spray heads designated by the reference numeral 2, are disposed in the horizontal portion of the foul pipe 1, and each communicates with a supply pipe 3. The foul pipe 1, bends downwardly and discharges into a mixing chamber 4, said foul pipe entering through the top of said chamber and terminating in an outwardly flared portion near the lower end of said chamber. The gas leaves the chamber 4, through an outlet pipe 5, near the top thereof, passing upwardly on its way to said outlet around a series of baffle plates 6, surrounding the foul pipe. A plurality of spray nozzles 7, connected to the supply pipe 3, in a manner similar to that of the nozzle 2, already described, are mounted in the upper end of the mixing chamber 4, and discharge thereinto, the spray meeting the ascending gas as it rises in its tortuous passage around the baffle plates.

The surplus liquor introduced into the foul pipe and mixing chamber through the respective nozzles 2 and 7, which is not taken up in the form of vapor and carried along by the gas, settles down into the lower portion of the mixing chamber and collects in a compartment formed in the lower end thereof by a double-conical baffle plate 8, with a tar overflow pipe 9, communicating into said compartment. As the liquid condensates settle downwardly through the conical baffle plate, their velocity tends to decrease, thus giving the tar an opportunity to separate and pass out through said pipe 9. Means are provided for forcing the liquor thus collected up to the respective spraying nozzles 2 and 7, and for heating it in its passage so that upon its introduction again into the foul pipe and mixing chamber it will be at the requisite high temperature. For this purpose a heater, designated as a whole by the reference numeral 10, is connected with the lower end of the mixing chamber by means of a pipe 11, and a heating coil 12, is disposed within said heater. A small pump 13, of any conventional type, is connected by a pipe with said heater 10, and is also connected with said supply pipe 3, and acts to pump the heated liquor upwardly through said supply pipe 3, to the respective spray nozzles. A flue pipe 14, is connected in the upper end of the heater, and is provided with a controlling valve 15, said flue pipe communicating in the exit pipe 5, which leaves the upper end of the mixing chamber. Another controlling valve 16, is also connected in said pipe 5, by which if desired the flow from said mixing chamber 4, may be cut off. The purpose of said flue pipe 14, is to permit any volatile products evolved in the heater 10, to be added to the gas passing through the pipe 5.

In the process thus far described the temperature of the gas has been maintained at such a degree as to prevent the particles of tar from being precipitated and furthermore the particles of tar are each enveloped with a layer of liquor, which prevents the tar from absorbing the valuable gaseous elements of the gas. The next step in the process consists in cooling the gas and extracting the tar as quickly as possible in a tar extractor designed for the purpose, the cooling and tar extraction being performed in what is practically a single operation. The ducts and chambers through which the gas has been passed up to this point are sufficient in area to allow the gas to come to a relatively quiescent state.

For the purpose of cooling and condensing the gas and precipitating the undesirable tar products therefrom, a scrubber is employed, which consists of a cylindrical or any other suitably shaped casing 17. The gas enters the scrubber at a point slightly below the middle thereof by means of an inlet pipe 18, which is provided with a valve 19, and is connected in a T 20, into which said pipes 5 and 14, respectively are also connected. The gas entering said scrubber 17, through said inlet pipe 18, flows into a compartment 21, the lower walls of which are formed by a double conical baffle plate member 22, similar to that described with reference to the mixing chamber 4. The outlet from the scrubber is at the upper end thereof and consists of a pipe 23, so that the gases introduced into the scrubber are constrained to flow upwardly therethrough. During such upward passage the gas first flows through a pair of adjustable grid members, the lower one of which consists of a normally stationary horizontal grid plate 25, said plate on two sides as clearly shown in detail in Fig. 8, slidably supported upon angle irons 26, secured on the inner walls of the scrubber casing. Said plate 25, is provided with a plurality of parallel slots 27, and the sides of the plate resting upon the angle irons 26, are recessed to receive the edges of a pair of adjustable plates or grids 28, therein, which also have a plurality of slots 29, therethrough. Said upper plate 25, is provided with a downwardly extending centrally disposed T portion 30, adapted to receive on each side thereof one of the projecting edges of the respective adjustable grid plates 28.

One wall of the scrubber 17, is cut away as clearly shown in Figs. 4 and 6, permitting a flanged extension or cover plate 31, integral with the upper slotted grid plate 25, to fit thereover. It is thus readily apparent that said associated grid plates 25 and 28, may be removed from the scrubber by merely sliding the same outwardly upon the angle iron guides 26, through said opening provided in the casing of the scrubber. For the purpose of adjusting the pair of lower grid plates 28, with respect to the fixed grid plate 25, long lead screws 32, are rigidly secured in the end of said plates 28, and project outwardly through a packing gland 33, provided in extensions of the cover plate 31, and each are engaged by a threaded nut 34, having a hand wheel 35, integral thereon. Said nut is provided with a circular flange which engages behind a semi-circular grooved boss 36, projecting outwardly from said cover plate, thus retaining the nut 34, in a fixed position, but permitting the same to rotate to move the adjustable grid.

Disposed directly above the respective grid plates 25 and 28, is another set of adjustable grid plates exactly similar in construction, and denoted by the reference numerals 37 and 38, respectively, in this case however, the stationary plate being the lowermost as indicated by the reference numeral 37. The slots in the grid plate 37, however, although parallel to the slots in the lower grid plates are staggered with respect thereto, as shown clearly in Fig. 5. However, the operating mechanism for shifting the upper adjustable grid plates 38, with respect to the lower grid plate 37, is exactly the same as that already described. Extending horizontally across the interior of said scrubber and disposed directly above and closely adjacent to the upper set of grid plates, is a fixed baffle plate 39, provided with a plurality of slots therein which are parallel to the slots in said grid plates, but staggered with respect thereto. Mounted horizontally within said scrubber 17, closely adjacent and superposed one above the other, are a series of baffle plates, each composed of a plurality of horizontal bars arranged in parallel relation affording passages therebetween, the first baffle plate 40, being disposed directly above the fixed slotted baffle plate 39. Mounted thereabove is another baffle plate 41, with the bars running crosswise of the bars of the plate 40, and the arrangement of the respective succeeding baffle plates 42, 43, 44, 45, 46, 47, and 48, the latter of which is at the top of the scrubber, is the same. The gas is cooled in its tortuous passage upwardly through said scrubber 17, and the tar is removed by contact with the cooled liquor which is introduced at the top of the scrubber through spray nozzles 49, the liquor percolating downwardly through the baffle plates and collecting in the lower end of the scrubber. The cool liquor introduced through said spray nozzles 49, is obtained from a compartment in the lower end of the scrubber through a small outlet pipe 50, which communicates with a pump 51, having an outlet pipe 52, therefrom, provided with a valve 53, leading upwardly to a liquor cooler of any suitable type designated by the reference numeral 54. The condensates from said cooler 54, pass upwardly to the nozzle 49, through a pipe 55, which is connected to said nozzles by short pipes 56. A valve 57, is provided in said cool liquor pipe 55, and is adapted to normally close off communication between said pipe 55, and a branch pipe 58, which leads downwardly and communicates in a supply pipe 59. Said supply pipe 59, which is provided with a valve 60, is merely for the purpose of introducing more liquid condensates into the heater 10, and lower end of the mixing chamber 4, if sufficient condensates are not formed in said chamber. A discharge pipe 61, is connected in the lower end of the scrubber 17, being also connected by means of a short pipe 62, with the lower end of the inlet pipe 18, to receive any liquid condensates collecting therein, and an outlet pipe is connected to said discharge pipes 61 and 62, through a suitable T, said outlet pipe being in the form of a U-connection to afford a seal for said discharge pipes, as indicated by the reference numeral 63.

By this apparatus an improved process for purification of the gas may be used, the tar and naphthalene being effectually removed and the valuable heat and light giving elements of the gas allowed to remain therein. The adjustable grids may be set to allow any desired degree of velocity of flow to pass therethrough, and inasmuch as the precipitation of the undesirable elements is a function of the velocity of the gas, it is readily apparent that by adjusting said grids the apparatus may be utilized to handle different quantities of gas equally well. The purpose of the small valved branch pipe 64, connected into the pipe 50, above the connection thereof to said pump 51, is to permit direct introduction into the scrubber of additional liquor, the same being pumped through the cooler 54, and introduced through the spray nozzles at the top of the device.

I am aware that various details of construction may be varied through a wide range without departing from the principles of this invention, and I therefore do not purpose limiting the patent granted otherwise than necessitated by the prior art.

I claim as my invention:

1. The process of treating gas as it comes from the retorts consisting of bringing said gas into intimate contact with a heated liquid at a higher temperature than the gas and then quickly cooling the gas to extract the tar and other impurities.

2. The process of treating gas as it comes from the retorts which consists of bringing said gas into intimate contact with a liquid in a finely divided form heated to a temperature sufficient to increase the heat and vapor content, and then passing said gas at high velocity through passages of small area and cooling the same to extract the tar and other impurities.

3. The process of treating gas as it comes from the retorts or ovens which consists of bringing the gas into intimate contact with liquid condensates preheated to a temperature to raise the heat and vapor content of the gas to the desired point, and then subsequently quickly cooling the gas to extract the tar and other impurities therefrom.

4. An apparatus for treating gas as it comes from the retorts or generators which consists of means for bringing said gas into intimate contact with a heated liquid, a series of baffle plates for said gas to impinge upon while moving at a high velocity, and mechanisms simultaneously cooling the gas by passing a cooled liquor over said baffle plates, thus removing the tar and other impurities from the gas.

5. A device for treating gas as it comes from the retorts or ovens which consists of means for bringing said gas into intimate contact with liquid condensates, means for heating said condensates to a temperature sufficient to raise the heat and vapor content of the gas and mechanisms for quickly cooling the gas comprising adjustable plates having openings therethrough which may be varied to cause the gas to pass through at high velocity, and means spraying a cooled liquid over said baffle plates to remove the tar and other impurities rapidly from the gas.

6. The process of treating gas and rapidly precipitating the impurities therefrom consisting of mixing the gas from the retorts with liquid condensates in a finely divided condition and heated to a temperature to increase the heat and vapor content, and then passing the gas at high velocity in a tortuous path while subjected to the action of a cool liquor.

7. The process of removing the tar from gas as it comes from retorts consisting of bringing the particles of tar into contact with a super-heated liquid at a temperature higher than that of the gas from the retorts, whereby the tar particles are surrounded by layers of liquid, and subsequently suddenly cooling the gas and precipitating the tar.

8. The process of removing impurities from gas as it comes from the retorts consisting of bringing the same into contact with a super-heated liquid at a temperature higher than that of the gas from the retorts whereby the impurities are enveloped thereby, then causing the gas with the enveloped impurities to flow in fine streams at high velocity and suddenly cooling the same to precipitate the impurities.

9. The process of removing tar smoke or other impurities from gas as it comes from the retorts consisting of bringing the same into contact with a super-heated spray of condensates at a higher temperature than the gas from the retorts, to envelop the particles of tar or other impurities therein and subsequently passing the gas with the enveloped particles at high velocity through tortuous passages subjected to the cooling action of a wash liquor to precipitate the tar and other impurities from the gas.

10. The process of gas purification for purifying gas as it comes from the retorts consisting of spraying the gas from the retorts with a super-heated condensate liquid, then passing the same downwardly into impingement with the surface of a condensate liquid and then upwardly through the spray of heated liquid condensates, and subsequently passing the gas so treated through tortuous passages and subjecting the same to the sudden cooling action of a wash liquor.

In testimony whereof I have hereunto subscribed my name in the presence of two subscribing witnesses.

BENJAMIN M. FERGUSON.

Witnesses:
  CHARLES W. HILLS, Jr.,
  FRANK K. HUDSON.